June 21, 1927.
E. L. GLUYAS
1,633,013
SUCKER ROD AND PLUNGER ROTATOR
Filed June 28, 1926
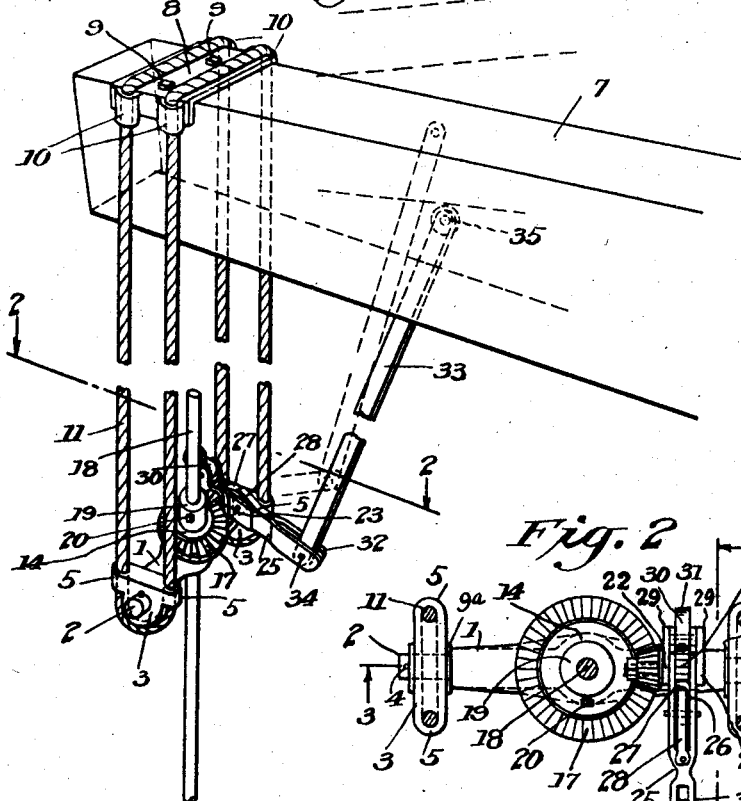
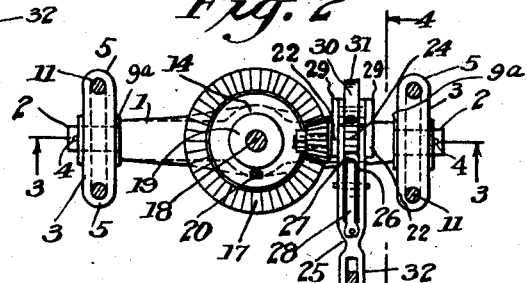
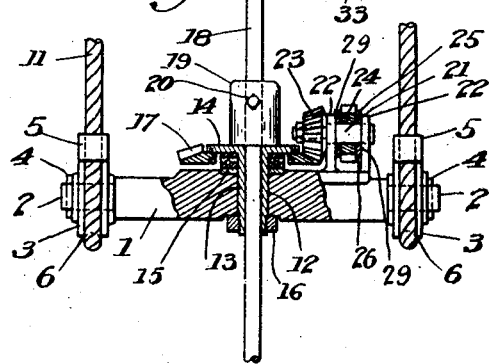
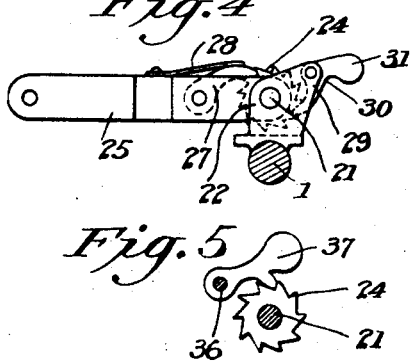
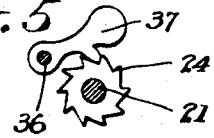
INVENTOR.
Edwin L. Gluyas,
BY Robt. D. Pearson
ATTORNEY.

Patented June 21, 1927.

1,633,013

UNITED STATES PATENT OFFICE.

EDWIN L. GLUYAS, OF MARICOPA, CALIFORNIA.

SUCKER ROD AND PLUNGER ROTATOR.

Application filed June 28, 1926. Serial No. 119,112.

This invention relates to sucker rod and plunger rotators, such as employed in oil well rigs, for slowly rotating the polish rod, sucker rod, and pump plunger, to equalize the wear and prolong the life of said rods and plunger, and the stuffing box packing, couplings and pump liners of the rig.

The general object of the invention is to provide a sucker rod and plunger rotator of the character stated which will be simple in construction and positive, and highly efficient in operation.

Other objects and advantages will appear hereinafter.

The invention is illustrated in the annexed drawing which forms a part of this specification and in which:

Fig. 1 is a perspective view of my invention shown applied to the end of the walking beam of an oil well rig.

Fig. 2 is a horizontal section of my invention taken on line 2—2 of Fig. 1.

Fig. 3 is a fragmentary view of my invention partly in elevation and partly in section taken on line 3—3 of Fig. 2.

Fig. 4 is a transverse vertical section of my invention taken on line 4—4 of Fig. 2.

Fig. 5 is a side view of a modified actuating pawl used in my rotator.

Corresponding reference characters designate the same parts in all the views.

In the drawing 1 designates a horizontal yoke formed at its ends with trunnions 2 on which are fitted swivel couplings 3 adjacent shoulders 9ª as shown, there being pins 4 driven through the ends of said trunnions to hold the couplings thereon. Each coupling 3 is formed with a pair of eyes 5 spaced transversely of its axis at the upper side thereof and with a groove 6 in its edge extending below said eyes from one to the other. On the upper side of the walking beam 7 of an oil well rig at the other end of said beam is secured a saddle plate 8 by means of bolts 9, at each side of which plate is formed a pair of eyes 10 which depend vertically from the upper side of the plate adjacent the sides respectively of the beam. A continuous cable 11 is extended over the plate 8 through its eyes 10 and through the eyes 5 and in the grooves 6 of the couplings 3, whereby the yoke 1 is suspended from the end of the walking beam 7.

The yoke 1 is provided with a bore 12 extending vertically therethrough midway between its ends, through which bore extends a sleeve 13 formed at its upper end with a disk head 14 which rests upon an end thrust bearing 15 on the upper side of the yoke, whereby the sleeve is turnably mounted in the yoke. The lower end of the sleeve 13 is threaded to receive a nut 16 which engages the lower side of the yoke to hold the sleeve in the yoke. To the edge of the head 14 is secured an annular bevel gear 17 coaxially with the sleeve 13. The polish rod 18 of the oil well rig extends through the sleeve 13 and a clamp 19 secured on the upper portion of the polish rod by a nut 20 rests upon the sleeve head 14 under the influence of the weight of said rod and the parts connected thereto, whereby said rod and parts are suspended on said head and the yoke 1, so that they will rotate with the head and bevel gear 17.

A stud shaft 21 is journaled in a pair of spaced bearings 22 upstanding from the yoke 1, on the inner end of which shaft is secured a bevel pinion 23 in mesh with the bevel gear 17, there being also a ratchet 24 secured on said shaft between said bearings and a pawl carrying lever 25 turnably mounted on said shaft between said bearings, which lever is provided with a longitudinal slot 26 extending through its inner end in which slot is turnably fitted the ratchet 24. An actuating pawl 27 is pivoted on the lever 25 in the slot 26 forwardly of the ratchet 24 and in engagement therewith under the influence of a flat spring 28 secured to the upper side of the lever 25. The bearings 22 are formed with rearward extensions 29 between which is pivoted a weighted holding pawl 30 formed with a weight 31 for engaging and holding the ratchet 24, shaft 21 and bevel pinion 23 while the actuating pawl 27 escapes the teeth of the ratchet. The forward end of the lever 25 is forked at 32 to receive the lower end of a connecting link 33 and is connected to said link by a pivot pin 34, the upper end of said link being pivotally connected at 35 to the side of the walking beam 7.

In the modification of my invention shown in Fig. 5 the spring-pressed pawl 27 is eliminated, and a weighted pawl 36, formed with a weight 37, is substituted therefor.

In operation, as the walking beam 7 swings up and down the link 33 swings the pawl actuating lever 25 down and up, and the pawl 27 on each upward stroke of the lever advances the ratchet 24 on the tooth, whereby the polish rod 18, sucker rod and plunger are intermittently rotated, through the medium of the shaft 21, bevel pinion 23, bevel gear 17, sleeve head 14 and clamp 19, the ratchet and parts rotated thereby being held against backward rotation by the holding pawl 31 when the actuating pawl 27 escapes the teeth of the ratchet on the downward stroke of the actuating lever 25.

Having thus described my invention what I claim is:

1. A rotator as described comprising a yoke, means for operatively suspending said yoke from the end of the walking beam of an oil well rig, a vertical sleeve extending through and turnably mounted in said yoke through which sleeve the polish rod of the rig extends, a head on the upper end of said sleeve upon which rests the polish rod clamp, a bevel gear secured on said sleeve head, a shaft journaled on said yoke, a bevel pinion on said shaft in mesh with said bevel gear, and means actuated by said walking beam for rotating said polish rod.

2. A rotator as described comprising a yoke, means for operatively suspending said yoke from the end of the walking beam of an oil well rig, a vertical sleeve extending through and turnably mounted in said yoke through which sleeve the polish rod of the rig extends, a head on the upper end of said sleeve upon which rests the polish rod clamp, a bevel gear secured on said sleeve head, a shaft journaled on said yoke, a bevel pinion on said shaft in mesh with said bevel gear, a ratchet secured on said shaft, a lever loosely mounted on said shaft, a pawl on said lever for engaging and rotating said ratchet, and a link connecting said lever and said walking beam.

3. A rotator as described comprising a yoke, means for operatively suspending said yoke from the end of the walking beam of an oil well rig, a vertical sleeve extending through and turnably mounted in said yoke through which sleeve the polish rod of the rig extends, a head on the upper end of said sleeve upon which rests the polish rod clamp, a bevel gear secured on said sleeve head, a shaft journaled on said yoke, a bevel pinion on said shaft in mesh with said bevel gear, a ratchet secured on said shaft, a lever loosely mounted on said shaft, a pawl on said lever for engaging and rotating said ratchet, a link connecting said lever and said walking beam, and a holding pawl mounted on said yoke for engaging and holding said ratchet against backward movement.

4. A rotator as described comprising a yoke, means for operatively suspending said yoke from the end of the walking beam of an oil well rig, a vertical sleeve extending through and turnably mounted in said yoke through which sleeve the polish rod of the rig extends, a head on the upper end of said sleeve upon which rests the polish rod clamp, an end thrust bearing between said head and the upper side of said yoke, a bevel gear secured on said sleeve head, a shaft journaled on said yoke, a bevel pinion on said shaft in mesh with said bevel gear, and means actuated by said walking beam for rotating said polish rod.

5. A rotator as described comprising a yoke, means for operatively suspending said yoke from the end of the walking beam of an oil well rig, a vertical sleeve extending through and turnably mounted in said yoke through which sleeve the polish rod of the rig extends, a head on the upper end of said sleeve upon which rests the polish rod clamp, a bevel gear secured on said sleeve head, a pair of spaced bearings upstanding from said yoke, a shaft journaled in said bearings, a bevel pinion on said shaft in mesh with said bevel gear, a sleeve loosely mounted on said shaft between said bearings, said lever having a slot therein, a ratchet secured on said shaft in the slot of said lever, an actuating pawl on said lever for engaging and rotating said ratchet, and a link connecting said lever and said walking beam.

In testimony whereof I hereunto affix my signature.

EDWIN L. GLUYAS.